US008588969B2

(12) United States Patent
Frazier

(10) Patent No.: US 8,588,969 B2
(45) Date of Patent: Nov. 19, 2013

(54) ENHANCEMENTS TO MECHANICAL ROBOT

(75) Inventor: Milton Massey Frazier, San Marcos, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 2238 days.

(21) Appl. No.: 11/416,301

(22) Filed: May 1, 2006

(65) Prior Publication Data

US 2006/0293789 A1 Dec. 28, 2006

Related U.S. Application Data

(63) Continuation-in-part of application No. 11/069,405, filed on Mar. 1, 2005, now Pat. No. 7,047,108.

(51) Int. Cl.
*G06F 19/00* (2011.01)

(52) U.S. Cl.
USPC .......................................................... 700/245

(58) Field of Classification Search
USPC ................. 700/245, 259, 248, 249, 262, 275; 901/1, 42; 318/800
See application file for complete search history.

(56) References Cited

U.S. PATENT DOCUMENTS

| | | | | |
|---|---|---|---|---|
| 5,153,566 | A * | 10/1992 | Yun | 340/689 |
| 5,202,661 | A | 4/1993 | Everett et al. | 340/522 |
| 6,381,515 | B1 | 4/2002 | Inoue et al. | 700/245 |
| 6,422,508 | B1 * | 7/2002 | Barnes | 244/3.16 |
| 6,459,955 | B1 | 10/2002 | Bartsch et al. | 700/245 |
| 6,493,606 | B2 | 12/2002 | Saijo et al. | 700/245 |
| 6,529,802 | B1 | 3/2003 | Kawakita et al. | 700/245 |
| 6,542,788 | B2 | 4/2003 | Hosonuma et al. | 700/245 |
| 6,650,965 | B2 | 11/2003 | Takagi et al. | 700/245 |
| 6,754,560 | B2 | 6/2004 | Fujita et al. | 700/245 |
| 6,760,646 | B2 | 7/2004 | Osawa | 700/245 |
| 6,865,446 | B2 | 3/2005 | Yokono et al. | 700/245 |
| 2002/0103444 | A1 * | 8/2002 | Ricciardelli | 600/532 |
| 2002/0165638 | A1 * | 11/2002 | Bancroft et al. | 700/213 |
| 2003/0028286 | A1 * | 2/2003 | Glenn et al. | 700/245 |
| 2003/0109959 | A1 * | 6/2003 | Tajima et al. | 700/245 |
| 2004/0073337 | A1 * | 4/2004 | McKee et al. | 700/245 |
| 2005/0216126 | A1 * | 9/2005 | Koselka et al. | 700/259 |
| 2006/0166696 | A1 * | 7/2006 | Takamori et al. | 455/550.1 |

OTHER PUBLICATIONS

Md. Hasanussaman, T. Zhang, V. Ampornaramveth, P. Kiatisevi, Y. Shirai, H. Ueno; "Gesture Based Human-Robot Interatction Using a Frame Based Software Platform", 2004 IEEE International Conference of Systems, Man and Cybernetics, pp. 2883-2888.

Masahiro Fujita; "On Activating Human Communications with Pet-Type Robot AIBO", Proceeding of the IEEE, vol. 92, No. 11, Nov. 2004, pp. 1804-1813.

Yamada Seiji, Yamacuchi Tomohiro; "Training AIBO like a Dog—Preliminary Results" Proceedings of the 2004 IEEE International Workshop on Robot and Human Internactive Communication, Sep. 20-22, 2004, pp. 431-436.

Masahiro Fujita; "Digital Creatures for Future Enteraiment Robtics", Proceedings on the 2000 IEEE International Conference on Robotics & Automation, pp. 801-806.

* cited by examiner

*Primary Examiner* — John Q Nguyen
*Assistant Examiner* — Rodney P King
(74) *Attorney, Agent, or Firm* — John L. Rogitz

(57) ABSTRACT

A mechanical robot senses smoke or CO or other indication of air quality and alarms when air quality falls below a threshold.

5 Claims, 2 Drawing Sheets

ENHANCEMENTS TO MECHANICAL ROBOT

RELATED APPLICATION

This is a continuation-in-part of allowed U.S. patent application Ser. No. 11/069,405, filed Mar. 1, 2005 now U.S. Pat. No. 7,047,108.

FIELD OF THE INVENTION

The present invention relates generally to mechanical robots.

BACKGROUND OF THE INVENTION

In recent years, there has been increased interest in computerized robots such as, e.g., mechanical pets, which can provide many of the same advantages as their living, breathing counterparts. These mechanical pets are designed to fulfill certain functions, all of which provide entertainment, and also in many cases general utility, to the owner.

As an example, Sony's AIBO robot is designed to mimic many of the functions of a common household pet. AIBO's personality develops by interacting with people and each AIBO grows and develops in different way based on these interactions. AIBO's mood changes with its environment, and its mood affects its behavior. The AIBO can provide certain features and entertainment to the owner through such things as execution of certain tasks and actions based on its programming and the commands of the user. An AIBO can perform any number of functions, e.g., creating noise frequencies that resemble a dog's bark.

In general, a mechanical "robot" as used herein and to which the present invention is directed includes movable mechanical structures such as the AIBO or Sony's QRIO robot that contain a computer processor, which in turn controls electro-mechanical mechanisms such as wheel drive units and "servos" that are connected to the processor. These mechanisms force the mechanism to perform certain ambulatory actions (such as arm or leg movement).

SUMMARY OF THE INVENTION

A mechanical robot includes a body, a processor mounted on the body, and one or more electromechanical mechanisms controlled by the processor to cause the body to ambulate. A sensor such as a sound sensor (e.g., a microphone) and/or a motion sensor (e.g., a camera) is electrically connected to the processor, and the processor compares a sensed sound and/or image from the sensor with predetermined criteria to selectively generate an intruder alert in response. In this regard, the robot can use adaptive learning algorithms to learn from past decisions, e.g., a user can speak approvingly of "correct" intruder alert response and disapprovingly of incorrect intruder response and the robot, using, e.g., voice recognition software or tone sensors, can then correlate the action to whether it is "correct" or not using the user's input, which may also be made using a keyboard or keypad entry device on the robot. Sony' U.S. Pat. No. 6,711,469 discusses further adaptive learning principles.

In some non-limiting implementations the processor compares an image from the camera with data stored in the processor to determine whether a match is established. The intruder alert may be generated if a match is not established, i.e., if a sensed person is a stranger, or the intruder alert may be generated if a match is established if, for instance, the sensed person is correlated to a known "bad person". If desired, in the latter case the robot can include a wireless communication module and automatically contact "911" or other emergency response using conventional telephony or VOIP. The robot can also execute a non-lethal response such as emitting a shrill sound to alert nearby people.

In another aspect, a mechanical robot includes a body, a processor mounted on the body, and one or more electromechanical mechanisms controlled by the processor to cause the body to ambulate. Means on the robot sense a visible and/or aural disturbance and generate a signal in response. Also, means are on the robot for comparing a sensed sound and/or image represented by the signal with predetermined criteria, with means being provided on the robot for selectively generating an intruder alert in response to the means for comparing.

In still another aspect, a mechanical robot includes a body, a processor mounted on the body, and one or more electromechanical mechanisms controlled by the processor to cause the body to ambulate. A sensor such as a sound sensor (e.g., a microphone) and/or a motion sensor, which can be a multi-directional camera that can be preprogrammed based on user preferences and that can be accessed using a wireless module on the robot, is electrically connected to the processor. The processor compares a sensed sound and/or image from the sensor with predetermined criteria to selectively play music in response.

In another embodiment, a mechanical robot includes a body, a processor mounted on the body, and one or more electromechanical mechanisms controlled by the processor to cause the body to ambulate. An airborne sensor is on the body and outputs signals representative of air content. A spectral analysis device receives signals from the airborne sensor and outputs an analysis signal representative thereof. An alarm is provided on the body for selectively alarming based on the analysis signal.

The sensor may be a CO sensor, a CO2 sensor, a smoke sensor, or a combination thereof. The spectral analysis device can be implemented by the processor or as part of the sensor.

In another aspect of this latter embodiment, a mechanical robot includes a body, a processor mounted on the body, and one or more electromechanical mechanisms controlled by the processor to cause the body to ambulate. Means are on the robot for sensing airborne material, and means are on the robot for selectively alarming in response to the means for sensing.

In still another aspect of this latter embodiment, a method for alerting a person to hazardous air quality includes providing a mechanical robot and causing the robot to ambulate. The method also includes causing the robot to sense at least one indicia of air quality, and causing the robot to alarm if the indicia exceeds a threshold.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
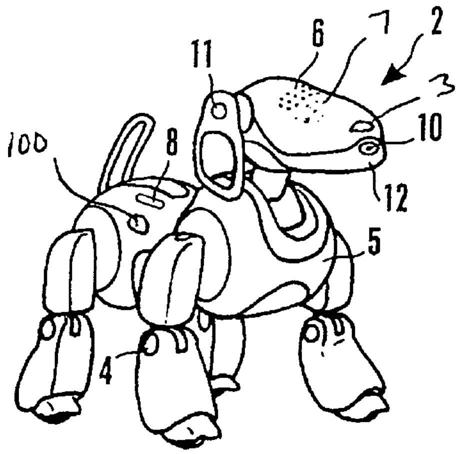
FIG. 1 is a perspective view of a non-limiting robot, schematically showing certain components.

Referring initially to FIG. 1, a mechanical, preferably battery-driven robot 2 is shown that may be embodied in a non-limiting implementation by a Sony AIBO-type or QRIO-type device, with the enhancements herein provided. The robot 2 has an airborne sensor 3 preferably located near the "nose" of the robot. The sensor 3 is an air sensor, and can include one or more of a smoke sensor, CO sensor, CO2 sensor, etc.

The robot 2 also has multiple servos 4 operating and moving extremities of a robot body 5. These servos are connected to a computer processor 6 that controls the servos using electromagnetic signals in accordance with principles known in the art. Additionally, as set forth further below, the processor 6 may have other functions, including face recognition using face recognition principles known in other contexts. The processor 6 may include or be operably engaged with a spectral analysis device 7 that receives signals from the airborne sensor 3 for purposes to be shortly disclosed. Alternatively, the spectral analysis device 7 may be implemented with the sensor 3.

In some non-limiting implementations an external beacon receiver 8 such as a global positioning satellite (GPS) receiver is mounted on the robot 2 as shown and is electrically connected to the processor 6. Other beacon receivers such as rf identification beacon receivers can also be used. Using information from the receiver 8, the processor 6 can determine its localization.

FIG. 1 also shows that a camera (such as a video camera) 10 is mounted on the robot 2. The camera 10 is electrically connected to the processor 6. The camera is a non-limiting example of a motion sensor. Other motion sensors such as passive infrared (PIR) sensors can be used.

As set forth further below, the camera 10 can be used as the robot's primary mode of sight. As also set forth below, as the robot 2 "roams" the camera 10 can take pictures of people in its environment and the processor 6 can determine face recognition based on the images acquired through the camera 10. A microphone 11 may also be provided on the robot 2 and can communicate with the processor 6 for sensing, e.g., voice commands and other sounds.

Additionally, the robot 2 may be provided with the ability to deliver messages from one person/user to another through an electric delivery device, generally designated 12, that is mounted on the robot 2 and that is electrically connected to the processor 6. This device can be, but is not limited to, a small television screen and/or a speaker which would deliver the optical and/or verbal message.

Figure 2:
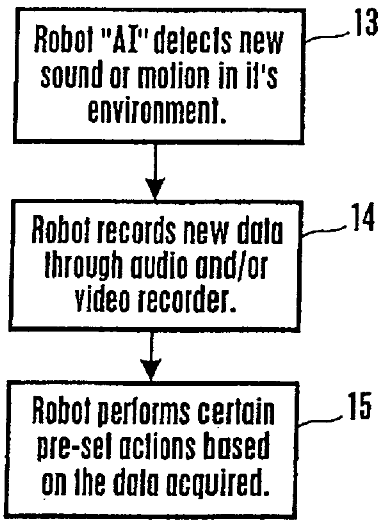
FIG. 2 is a flow chart of the overall logic.

Now referring to FIG. 2, a general logic diagram outlining the "Artificial Intelligence" process for a robot, such as AIBO, is shown. If desired, the logic may be performed in response to an owner's voice or other command, such as "start security robot".

Commencing at block 13, the robot detects a new sound (by means of the microphone 11) or motion (by means of the camera 10 or other motion sensor) in its environment. Disturbance detection can be performed by the robot by means known in the art, e.g., by simply detecting motion when a PIR or video camera is used. Further examples of disturbances are the sound of an alarm clock or a new person entering the robot's sensor range. Moving to block 14, the robot records data from the object creating the new disturbance. At block 16, the robot's processor 6 has the option of performing certain pre-set actions based on the new disturbance(s) it has detected as set forth further below.

Figure 3:
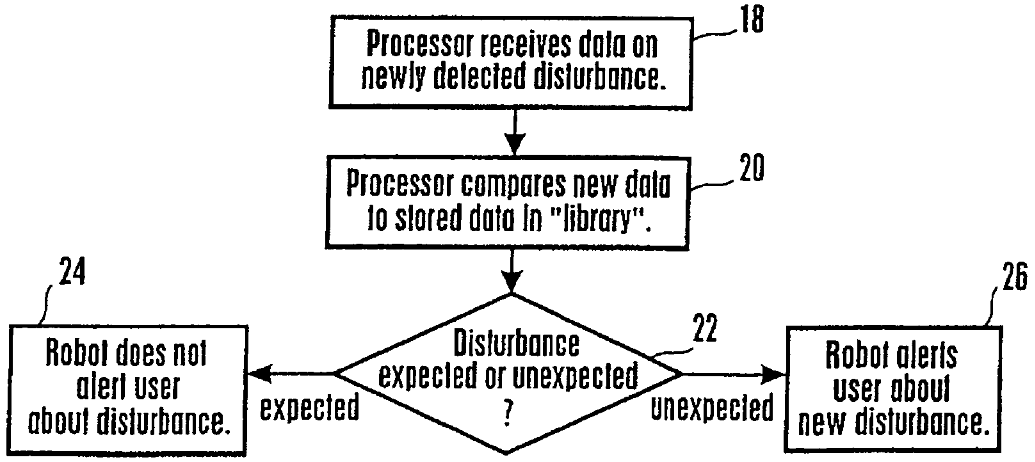
FIG. 3 is a flow chart of the alert logic.

In FIG. 3, a diagram is presented outlining the logic of the computer processor 6 on performing such pre-set actions. The processor's actions begin at block 18, where it receives collected data on the disturbance. It then compares this new data to stored data in the computer's database (called a library) at block 20. From there, decision diamond 22 denotes a choice on whether the disturbance requires activation of an alarm. For example, some disturbances such as routine clock chiming and images of family faces and/or voices can be programmed into the robot by a user, or (e.g., in the case of an owner's face that is routinely imaged) can be entered by the robot based on repetition, or may be expected based other circumstances. An alarm clock that chimes to denote the beginning of a new hour would be an example of an expected disturbance, while a new person entering the habitat may be considered unexpected.

In the latter regard, the robot can access face and/or voice recognition information and algorithms stored internally in the robot to compare an image of a person's face (or voice recording) to data in the internal database of the robot, and the robot's actions can depend on whether the face (and/or voice) is recognized. For instance, if a person is not recognized, the robot can emit an audible and/or visual alarm signal. Or again, if the person is recognized and the internal database indicates the person is a "bad" person, the alarm can be activated.

If the new data is expected or at least does not correlate to a preprogrammed "bad" disturbance, the logic proceeds to block 24, where the robot does not alert the user on the new disturbance. If the new data is not expected or otherwise indicates an alarm condition, however, the logic then moves to block 26. At block 26 the robot alerts the user about the new disturbance. A robot can perform the alert function in many ways that may include, but are not limited to, making "barking" sounds by means of the above-mentioned speaker that mimic those made by a dog, flashing alert lights on the above-mentioned display or other structure, or locating and making physical contact with the user in order to draw the user's attention.

Additionally, when an "expected" or "good" person is recognized by virtue of voice and/or face recognition, the robot may correlate the person to preprogrammed music or other information that the person or other user may have entered into the internal data structures of the robot as being favored by the person. Then, the information can be displayed on the robot, e.g., by playing the music on the above-mentioned speaker.

Figure 4:
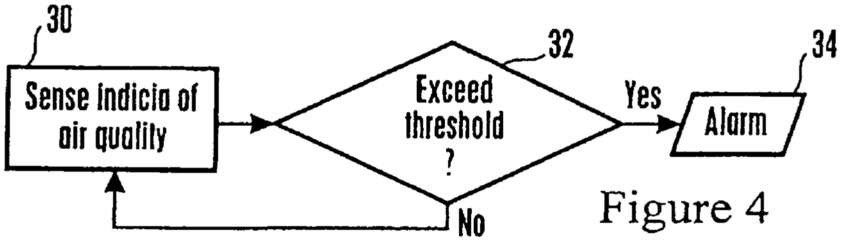
FIG. 4 is a flow chart of airborne alarm logic.

Now referring to FIG. 4, the robot can be used to alarm if air quality is poor or otherwise indicate air quality. Commencing at block 30, the sensor 3 senses one or more indicia of air quality, such as but not limited to CO, CO2, smoke, oxygen content, etc. For more complex indicia the signal from the sensor 3 may be sent to the spectral analysis device 7 for producing a signal representative of the indicia; for simpler indicia or if the sensor 3 incorporates the analysis device 7, the signal can be sent directly to the processor 6. In any case, moving to decision diamond 32, an appropriate logic device such as, e.g., the processor 6 determines whether the index has exceeded a threshold, e.g., whether oxygen is too low or CO or CO2 or smoke particulate content is too high. If the threshold is violated the logic moves to block 34 to generate an indication on a gage 100, such as a gage indication of the particular index being measured or more preferably an alarm such as a bark produced over the delivery device 12.

While the particular ENHANCEMENTS TO MECHANICAL ROBOT as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean “one and only one” unless explicitly so stated, but rather “one or more”. It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A mechanical robot, comprising:

a body;

at least one processor mounted on the body;

at least one electro-mechanical mechanism controlled by the processor to cause the body to ambulate;

an airborne sensor on the body and outputting at least first and second signals representative of respective first and second indicia of air content, the first and second indicia representing respective first and second elements of air quality, the first and second elements being different elements from each other;

a spectral analysis device receiving signals from the airborne sensor and outputting an analysis signal representative thereof; and a gage on the body presenting a gage indication of the analysis signal, wherein the spectral analysis device is implemented in the airborne sensor.

2. The robot of claim 1, wherein the airborne sensor includes a CO sensor.

3. The robot of claim 1, wherein the airborne sensor includes a CO2 sensor.

4. The robot of claim 1, wherein the airborne sensor includes a smoke sensor.

5. The robot of claim 1, wherein the spectral analysis device is implemented by the processor.

* * * * *